US006269762B1

(12) United States Patent
Commandeur

(10) Patent No.: US 6,269,762 B1
(45) Date of Patent: Aug. 7, 2001

(54) VESSEL-TURRET ASSEMBLY HAVING RADIALLY GUIDED BOGIE WHEELS

(75) Inventor: Johan Albert Commandeur, Zwijndrecht (NL)

(73) Assignee: IHC Gusto Engineering B.V., Schiedam (NL)

( * ) Notice: Subject to any disclaimer, the term of this patent is extended or adjusted under 35 U.S.C. 154(b) by 0 days.

(21) Appl. No.: 09/319,965

(22) PCT Filed: Dec. 12, 1997

(86) PCT No.: PCT/NL97/00689

§ 371 Date: Jul. 26, 1999

§ 102(e) Date: Jul. 26, 1999

(87) PCT Pub. No.: WO98/25813

PCT Pub. Date: Jun. 18, 1998

(30) Foreign Application Priority Data

Dec. 13, 1996 (GB) .................................................. 9625991

(51) Int. Cl.[7] .................................................... B63B 21/00
(52) U.S. Cl. ........................................ 114/230.12; 114/293
(58) Field of Search ................................. 114/293, 230.1, 114/230.12; 441/3–5; 166/354, 355

(56) References Cited

U.S. PATENT DOCUMENTS

| 4,343,055 | 8/1982 | Bergling . |
| 5,515,804 | 5/1996 | Pollack . |
| 5,746,148 | * 5/1998 | Delago .................................. 114/230 |

FOREIGN PATENT DOCUMENTS

| 0 197 069 | 10/1986 | (EP) . |
| 2 670 742 | 6/1992 | (FR) . |
| 2 198 407 | 6/1988 | (GB) . |
| 2 286 167 | 8/1995 | (GB) . |
| WO 86/02329 | 4/1986 | (WO) . |
| WO 93/07049 | 4/1993 | (WO) . |

* cited by examiner

*Primary Examiner*—Ed Swinehart
(74) *Attorney, Agent, or Firm*—Young & Thompson

(57) ABSTRACT

A vessel-turret assembly with an opening (3) in the hull of the vessel wherein a turret (4) is rotatably received. The axial bearings (8) between the hull structure and the turret have a number of circumferentially spaced bogies (12) running on raceways. Each of the bogies (12) is mounted on a displacement element such as an elastically deformable element. The bogie body may comprise a side plate with flange or shaft which in a hingepoint is hingedly attached to the hull structure. This point is located near or on the plane defined by the load bearing surfaces of the wheels. In this way a radial movement of the load bearing surfaces of the wheels. In this way a radial movement of the load bearing surfaces of the wheels due to the elastical deformable elements is prevented. Alternatively, each bogie may comprise one or more axial wheels for engaging the hull structure and/or the turret to prevent radial movement of the bogie structure at the position of the load bearing surface of the wheels. When the bogies are mounted on an elastically deformable element, the bogies can be easily exchanged by compression of this element followed by removal of the bogies.

13 Claims, 5 Drawing Sheets

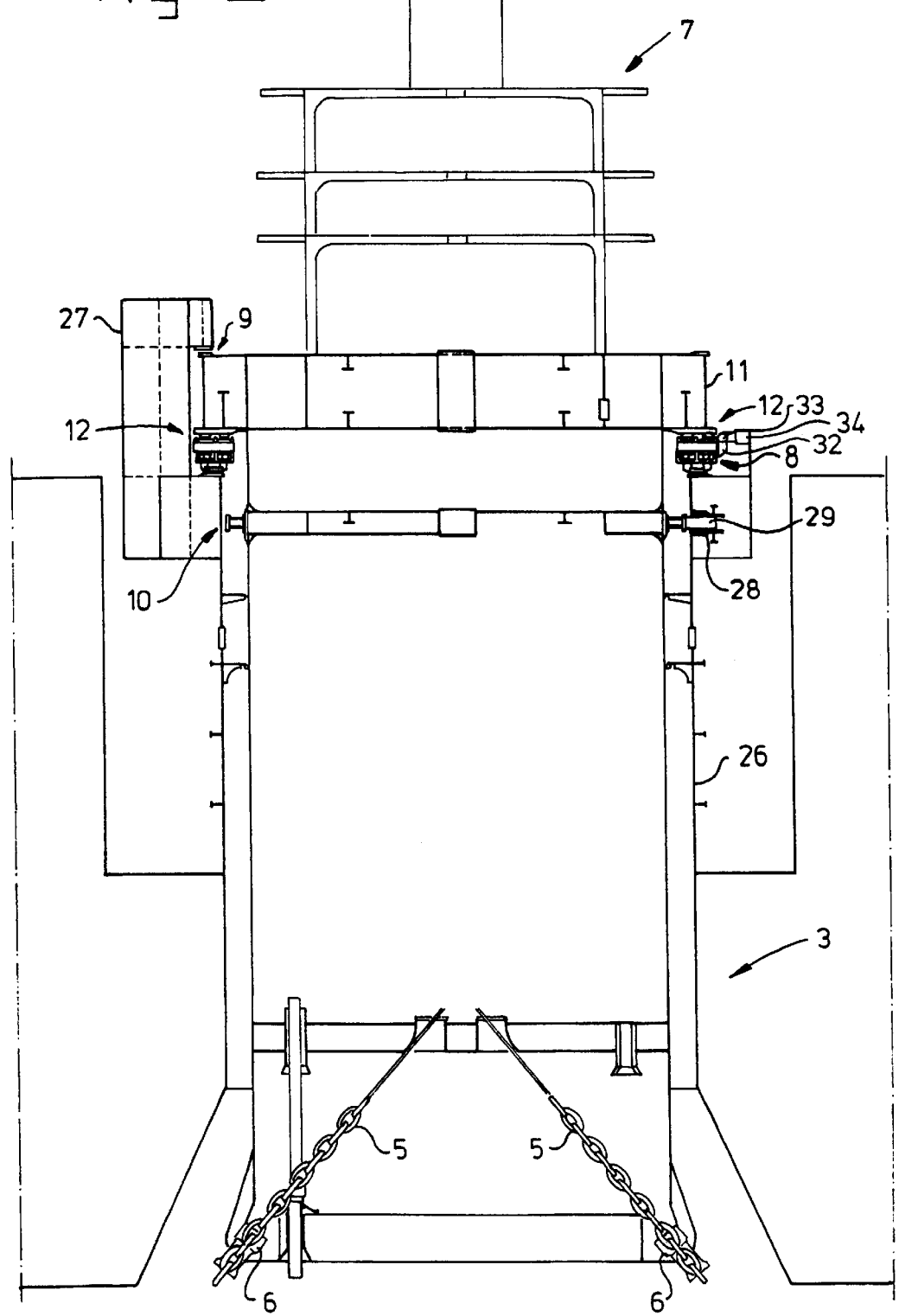

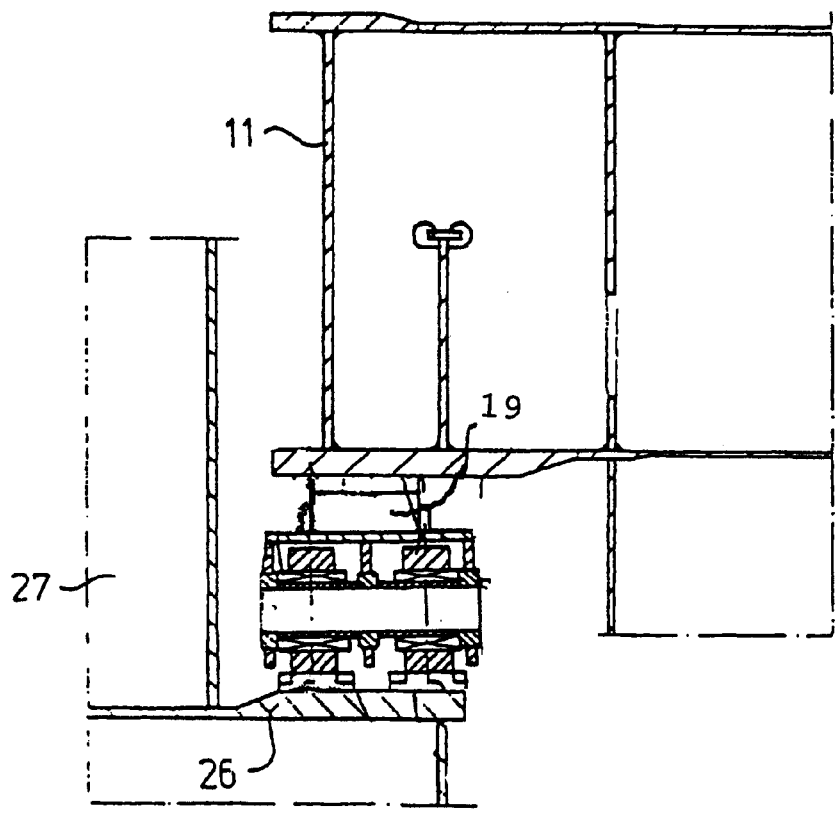

VESSEL-TURRET ASSEMBLY HAVING RADIALLY GUIDED BOGIE WHEELS

BACKGROUND OF THE INVENTION

The invention relates to a vessel-turret assembly comprising a hull structure for accommodating a turret, wherein bearing means are provided between said hull structure and said turret comprising axial bearing means supporting the weight of said turret, said axial bearing means comprising a raceway on either the hull structure or on the turret as well as rolling members running on said raceway, the turret being provided with a collar, said rolling members comprising at least three circumferentially spaced sets of bogies each comprising at least two rolling wheels rotating on shafts mounted in a bogie body comprising a supporting base structure which is connected to an attachment surface on either the hull structure or on the collar of the turret, wherein the other one of the hull structure or collar is provided with said raceway and wherein a displacement element is placed between said bogie body and the attachment surface.

Such a structure is generally known in the art. For offshore applications there is an increased tendency to the use of floating structures, such as vessels, to replace platforms for exploitation of oil wells. One reason is the lower costs involved whilst the other one is the possibility to provide a storage in the vessel proper.

To permit weathervaning of the vessel during connection with a sub sea oil well, a turret member is provided either inside the hull structure or at its bow or stern end. The vessel can rotate with regard to the turret and via the lower side of the turret, risers from one or more sub sea oil wells are received. On top of the turret a swivel is provided realizing a rotatable fluid connection between the turret and the vessel.

To optimize the use of sub sea oil wells and to optimize efficiency of the vessel the number of conduits extending through the turret as well as their diameter is increasing. In addition, for optimizing the production of the oil field, fluids, such as gas or steam, are injected.

To increase efficiency more conduits are connected to one turret and/or the diameter of each conduit is increased.

Consequently, there is an increasing need to larger diameter turrets. However, one of the limiting structural features is the axial bearing supporting a turret in the hull structure.

Up to now roller bearings have been used. The maximum diameter for such roller bearings is about 14 meters at the time being and the costs involved for such a bearing are high.

It must be borne in mind that at increasing the diameter of such bearing the fitting tolerances of several of the bearing parts and associated machine accuracy has to remain very high.

Because these bearings are custom made it can take up to a year after order before such a bearing is delivered. This means that after failure a turret structure comprising such bearings will be out of service during a considerable time.

It has been proposed to replace such a bearing by plain bearings. For example sliding pads could be used. Although it is less likely that such bearings will be damaged and such bearings are much cheaper, the weathervaning properties of the vessel dramatically decrease. This means that during a first part of rotation of the vessel because of changing wind and waves the turret will move along with the vessel. The anchor chains connected to the turret are subjected to considerable rotational forces which means that such chains, which are relatively heavy are subject to interlink wear and consequently to unforeseen failure.

From WO 93/07049 a turret-assembly is known in which the turret in axial direction is supported on a plurality of bearing arms which carry axial and radial bearing elements. The axial bearing elements are formed by bogie wheels which are supported on a double raceway on the vessel. The bogie wheels are mounted in a bracket which is connected to the radial arms by means of a rubber filler which eliminates sliding movements in the bearings of the wheels in the bogies and will help even out the load on the wheels.

To each arm a support wheel is connected having its rotation axis aligned in the axial direction. The circumferential surface of the guide wheel runs along the hull structure. Even though movement of the turret in the radial direction can be prevented to a certain extent, it is still possible that the bogie wheels may move relative to the raceways. This can lead to an increased wear and reduced service life. It is therefore an object of the present invention to allow for relative movements of the turret and the hull structure, while maintaining an accurately defined position of the load-bearing surfaces of the bogie wheels on the raceways.

The known construction has as a further disadvantage that in case of failure of a bogie, it will be difficult to replace. This will mean that the known turrets will be out of service for a relatively long time when failure of a bogie occurs.

SUMMARY OF THE INVENTION

The present invention also aims to provide an improved axial low friction bearing for a vessel-turret assembly which upon brake down can be easily and rapidly removed and exchanged by a new bogie.

This aim is realized with a vessel-turret assembly as described above wherein the bogie body comprises at least one side support member substantially perpendicular to the shafts of the wheels and guide means cooperating on the one hand with the side support member or with the shaft of the wheels and on the other hand with the hull structure to reduce radial movement of the bogies substantially at the load-bearing surface of the wheels. Because the guide means according to the present invention are connected the shaft or to an outer support member, such as a side plate of the bogies, they reduce radial movement of the bogie wheels on the raceways while still allowing for sufficient radial movement of the bogie bodies with respect to the attachment surface by means of the displacement element. The displacement element may comprise a slide bearing, an elastomeric pad, or equivalent elements.

According to one embodiment of the vessel-turret assembly according to the present invention the guide means comprise at least two guide wheels having a rotation axis extending in the axial direction, the guide wheel axis being connected to either one of the hull structure or the outer support member, the circumference of the guide wheel contacting the other one of the hull structure or the outer support member. Two guide wheels may be attached to an outside support member of the bogie body to run along the hull structure, one guide wheel being attached to an inner side support member of the bogie body proximal to the turret. In this construction, a three-point support of each bogie body is achieved whereby accurate positioning of the running surfaces of the wheels along the raceways is possible.

In a preferred embodiment, the guide means comprise an ear on the side support member of the bogie body which is proximal to the hull structure or on the shaft of the wheels which are supported therein, which ear in a hingepoint is hingedly attached to the hull structure, the hingepoint being located in or near a plane defined by the load-bearing surface of the wheels. By means of the hinging roll, the load-bearing surfaces of the wheels are accurately maintained parallel to the raceways, whereas the other parts of the bogie body are allowed to move relative to the raceways.

In case the displacement element is formed by an elastically deformable pad, the bogie wheels can be easily removed and exchanged for maintenance purposes. By compression of the elastically deformable element, the supporting base can be lifted away from the attachment surface, which can be present on the hull structure of the vessel. Use is made in this way of the elastical deformable element to provide for exchangeability of the individual bogies. In this manner an individual set of wheels can be easily and rapidly replaced for maintenance purposes with a minimum down time for the vessel-turret assembly.

In one embodiment, the bogie body is releasably attached to two support beams which are mounted to the attachment surface in a releasable manner, a clearance being formed between the support beams. By placing a jack in the clearance between the bogie body and the attachment surface, the bogie body can be lifted from the support beams by compression of the elastically deformable element. After removal of the support beams from beneath the bogie body, the set of wheels can be lowered such that they run free from the raceway, and the bogie can be replaced.

To further increase the load bearing capacity of the bogies according to a preferred embodiment of the invention on each shaft of the bogie two radially adjacent rolling means are provided. It is possible to use a single raceway for two of such radially adjacent rollers but preferably (in view of costs and machine tolerances) two of such raceways are positioned radially adjacent to each other.

To improve easy exchangeability of the bogies or parts thereof, these bogies are preferably connected to the deck level of the opening in the hull structure.

The axial bearing means according to the invention support the load of the turret in the hull structure.

However, during heavy sea it is possible that the turret is subjected to a force urging it in upward direction. To prevent axial movement in upward direction according to a further preferred embodiment of the invention the collar is provided at its upper end with further axial bearing means.

Because such further axial bearing means will usually only be effective under extreme circumstances they can comprise plain bearings. During temporarily loading of such further axial bearings there will usually not be any weathervaning.

To prevent the turret from contacting the wall of the opening in the hull structure according to a further embodiment radial bearing means are provided. To retain accessibility of the axial bearing means according to the invention such radial bearing means are preferably provided below the axial bearing means as described above.

BRIEF DESCRIPTION OF THE DRAWINGS

The invention will be further elucidated referring to a preferred embodiment of the in which is described below and shown in the drawings, wherein:

FIG. 2 shows an enlarged detail of FIG. 1 of several components of the vessel-turret assembly, some of which are shown in cross section;

FIG. 7 shows a cross section of the bogie-collar where the raceway is mounted on the hull structure.

DESCRIPTION OF THE PREFERRED EMBODIMENTS

FIG. 7 shows a cross section of the bogie-collar where the raceway is mounted on the hull structure.

Figure 1:
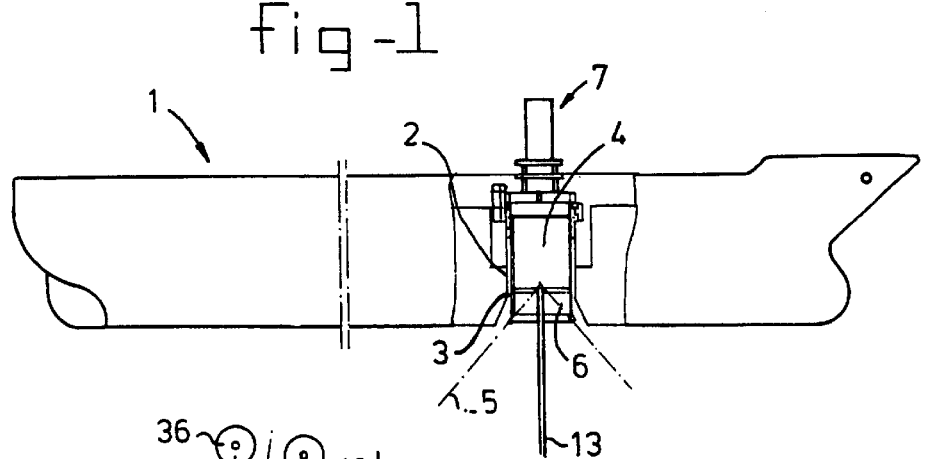
FIG. 1 shows schematically in side view a vessel provided with a turret and swivel.

In FIG. 1 a vessel is indicated by 1. It has to be understood that instead of a vessel any other floating structure can be used with the invention. In the hull 2 of the vessel 1 an opening 3 is provided for receiving a turret 4. It must be emphasized that turret 4 can also be accommodated in a structure extending from the hull, for example at the bow or stern end of the vessel. At its lower end, located near keel-level of the hull structure, the turret 4 can be provided with quick disconnect means to which anchor chains 5 are connected as well as risers 13. On top of the turret a swivel 7 is provided realizing fluid connection between risers 13 and pipe lines on deck of vessel 1.

in FIG. 2 a detail is shown from the hull structure-turret. It can be seen that opening 3 is defined by wall 26 of which the upper part is independent from the remaining portion of the vessel. Flexing of the vessel will not be transferred to the upper part of wall 26. Between upper part of wall 26 and collar 11, being the top part of turret 4, bearing means 8 acting in axial direction are provided. On top of wall 26 several counter clamps 27 are provided circumferentially spaced around collar 11. Between collar 11 and circumferential clamps 27 spaced bearing pads of axial bearing 9 are provided. If there is an upward urge on turret 4 during heavy sea condition upward stroke of turret 4 relative to the hull structure is restricted by the clearance between the pads of bearing 9. Bearing 9 is a plain bearing.

Below axial bearing 8 radial bearing 10 is provided comprising a number of wheels 29 rolling in a U-groove 28.

In FIGS. 3–6 details of axial bearings 8 are shown. From these figures it is clear that a number of bogies 12 is connected to the upper side of wall 26 or the lower side of clamp 27. This connection is through a mounting structure 18 in which shafts 24 are provided on which rolling wheels 17 are rotatably fixed through roller bearings 16. Wheels 17 each engage a raceway 14, 15 respectively. Each bogie comprises four wheels, two adjacent to each other, and one set in front of the other.

Mounting structure 18 is connected to attachment surface 26 through an elastomeric bearing 19, and a supporting base 20. Instead of an elastomeric bearing, a slide bearing having flat sliding surfaces may be used. Connection between supporting base 20 and attachment surface 26 is through shear key 21. Shear key 21 is received in removable support beams 22, releasably connected to supporting base 20.

Between the removable support beams 22 a clearance or cavity 23 is provided for receiving a hydraulic flat jack which is not further shown. If such a flat jack is introduced and actuated, the elastomeric bearing element 19 is compressed and the supporting base plate 20 is lifted from the support beams 22. Thereafter, the support beams 22 can be removed and the related bogie can be lowered and replaced by another bogie structure. In this construction, the height of the bogie structure may be about 1.5 m, the height of the clearance 23 being about 12 cm. The weight of the total bogie structure may amount to about 10.000 kg.

Figure 3:
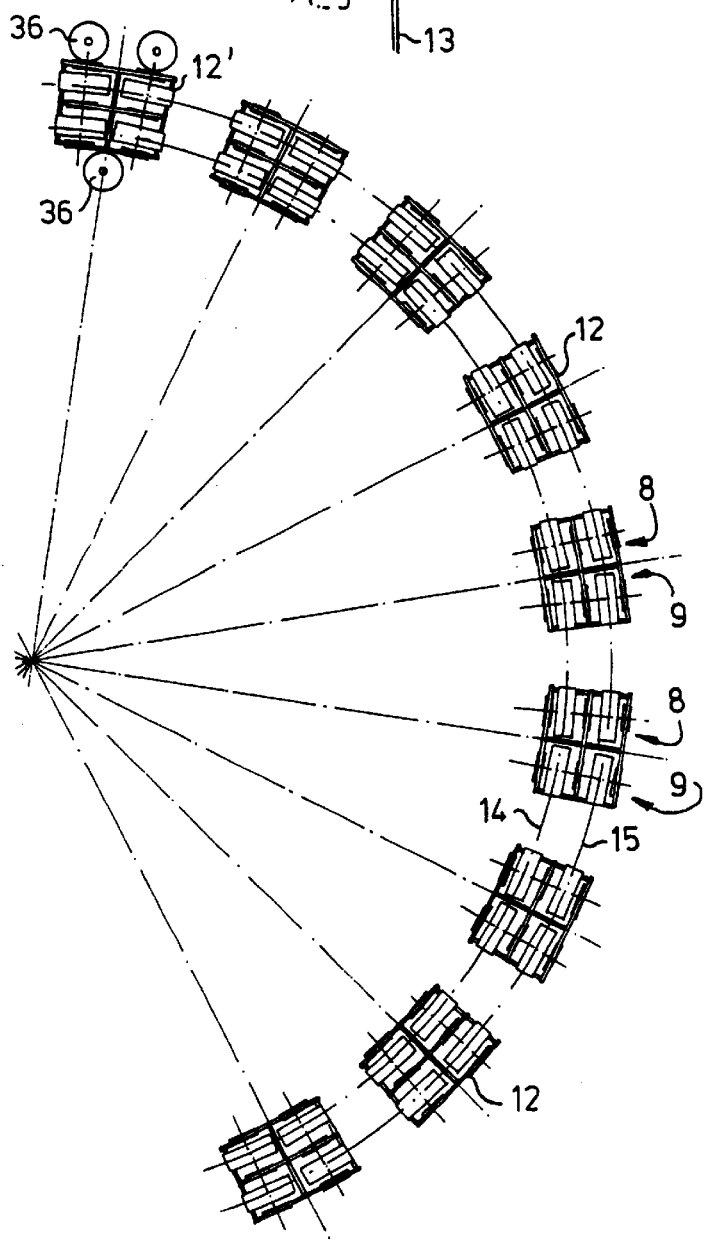
FIG. 3 shows a top view of a number of bogies according to the invention.
Figure 4:
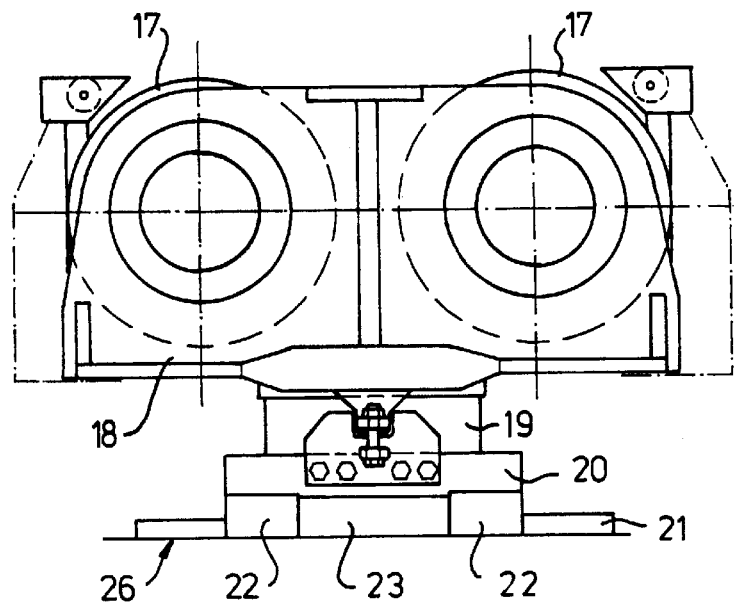
FIG. 4 shows in detail a radial view of a section of a bogie according to the invention.

From FIG. 3 it is clear that a considerable number of bogies can be used. If one or more of such bogies fail they can easily be replaced even during adverse weather conditions. Because the bogies are a relatively cheap standardized product the costs will be relatively low allowing for storage on the vessel, so that immediate replacement is possible.

Through the provision of the elastomeric bearing 19 compensation of inaccuracies during manufacturing or deformation of several of the parts during service is easily effected.

Because of the position of the axial bearing means 8 according to the invention removal of the bogies is not hampered by another structure of the vessel exceptly from the counter clamps 27. However, it should be noted that only a few of such counter clamps are provided and the space in between them is easily accessible for replacement of the bogie structure.

It is also possible to position the clamp 27 in the proximity of the radial bearing 10 to further improve the accessibility of the bogies 12.

Figure 6:
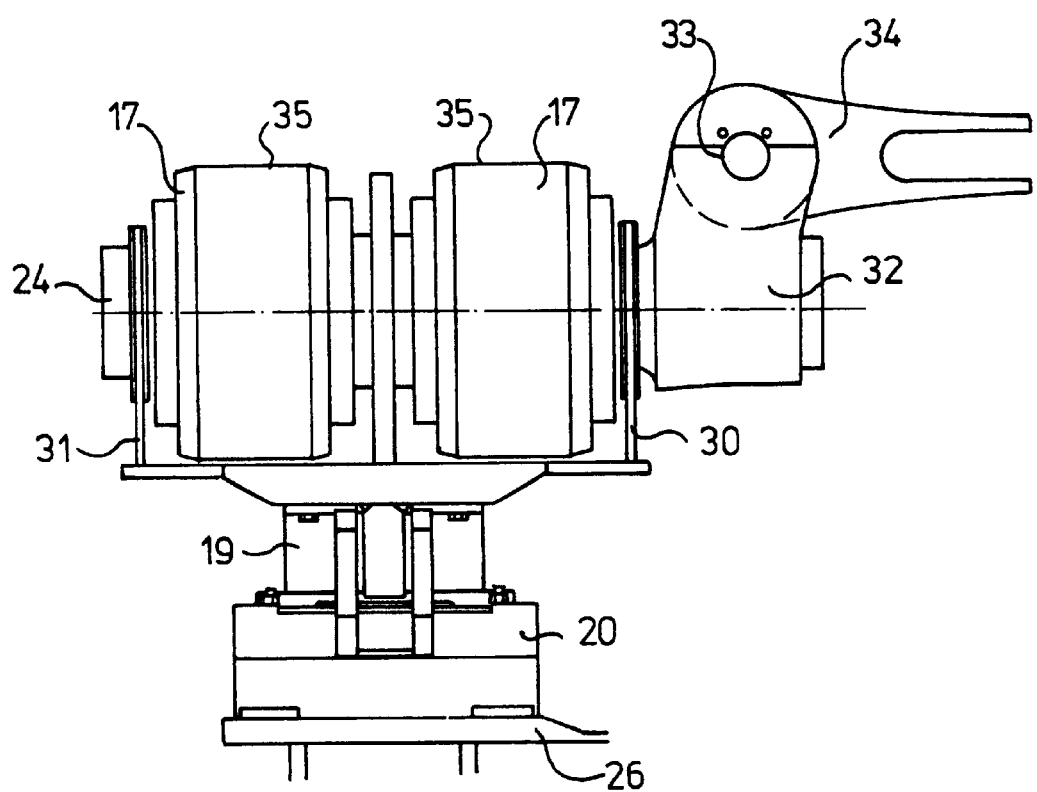
FIG. 6 shows in detail a circumferential view of a bogie according to the invention.

FIG. 6 shows a view in the circumferential direction of a bogie structure wherein the shafts 24 of the wheels 17 are mounted in two side plates 30, 31. Directly on the shaft 24, a flange 32 is attached having a hinge point 33. The hinge point 33 is located in the plane defined by the load-bearing surfaces 35 of the wheels 17. In the hinge point 33, the flange 32 is pivotably connected to the vessel through a tie-rod 34. Hereby a radial displacement, in the direction of the shafts 24 of the wheels 17 is prevented. Still, the wheels 17 can move on the elastomeric bearing 19 around the fixed hinge point 33 to accommodate for positional variations between the attachment surface 26 of the vessel and the racetracks of the load-bearing surfaces 35.

Figure 5:
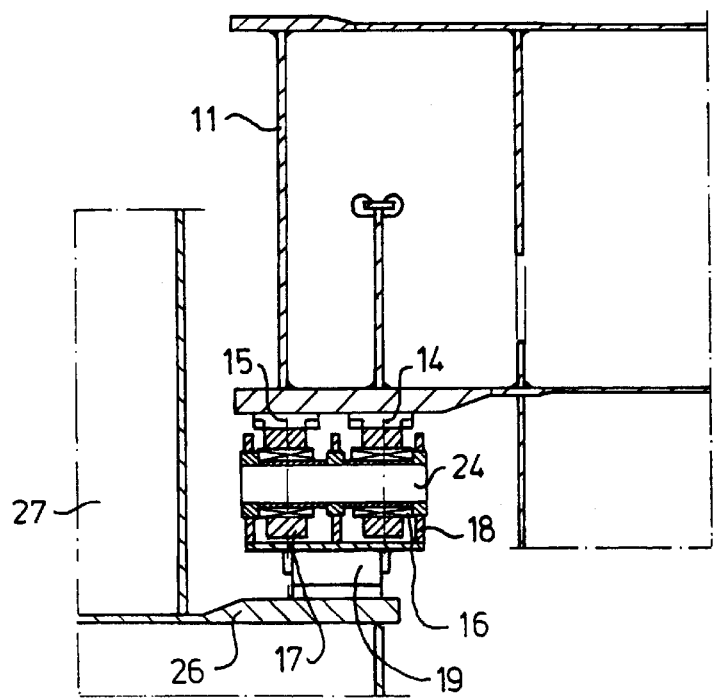
FIG. 5 shows in detail a cross section of the bogie-collar according to the invention.

FIG. 7 shows the opposite arrangement of FIG. 5, namely the raceway is on the hull and the base supporting structure is on the collar.

Although the invention has been elucidated above referring to preferred embodiments at the time being it has to be understood that many changes are obvious for the person skilled in the art and within the range of the appended claims.

What is claimed is:

1. Vessel-turret assembly comprising a hull structure (2) for accommodating a turret (4), wherein bearing means are provided between said hull structure and said turret, comprising axial bearing means (8) supporting the weight of said turret, said axial bearing means (8) comprising a raceway (14,15) on either the hull structure or on the turret (4) as well as rolling members running on said raceway, the turret being provided with a collar (11), said rolling members comprising at least three circumferentially spaced sets of bogies (12), each comprising at least two rolling wheels (17) rotating on shafts (24) mounted in a bogie body (18), comprising a supporting base structure (20) which is connected to an attachment surface (26) on either the hull structure or on the collar of the turret, wherein the other one of the hull structure or collar is provided with said raceway (14,15), wherein between said bogie body and the attachment surface a displacement element (19) is situated for allowing radial displacement of the bogie body with respect to the raceways, the bogie body comprising at least one side support member (30) substantially perpendicular to the shafts of the wheels and guide means (32,33,36) cooperating with the side support member (30) or with the shafts (24) and with the hull structure to reduce radial movement of the bogies (12) substantially at the load-bearing surface of the wheels.

2. Vessel-turret assembly according to claim 1, wherein the guide means comprise at least two guide wheels (36) having a rotation axis, extending in the axial direction, the guide wheel axis being connected to either one of the hull structure or the side support member (30), the circumference of the guide wheel contacting the other one of the hull structure or the side support member (30).

3. Vessel-turret assembly according to claim 2, wherein two guide wheels are attached to an outer side support member, proximal to the hull structure, one guide wheel being attached to an inner side support member of the bogie body, proximal to the turret.

4. Vessel-turret assembly according to claim 1 wherein the guide means comprise an ear (32) on the side support member or on the shafts (24) of the bogie body (18), proximal to the hull structure, which ear in a hinge point (33) is hingedly attached to the hull structure, the hinge point being located in or near a plane defined by the load-bearing surface of the wheels.

5. Vessel-turret assembly according to claim 4, wherein the hinge point (33) is located above the shaft (24) of the wheels, preferably at the level of the load-bearing surface.

6. Vessel-turret assembly according to claim 4, wherein the ear (32) is releasably attached to the vessel via an arm (34) which with one end is releasably connected to the hinge point (33) and with its other end is connected to the hull structure.

7. Vessel-turret assembly according to claim 1, wherein the displacement element (19) comprises an elastically deformable element.

8. Vessel-turret assembly according to claim 1, wherein on each shaft on said body two adjacent rolling wheels (17) are provided.

9. Vessel-turret assembly according to claim 8, wherein two adjacent raceways (14,15) for each of said adjacent rolling wheels are provided on the other of the hull structure or collar.

10. Vessel-turret assembly according to claim 1, wherein the bogies are connected to the hull structure near deck level of an opening in the hull structure.

11. Vessel-turret assembly according to claim 1, wherein the collar is provided at its upper end with further axial bearing means (9).

12. Vessel-turret assembly according to claim 11, wherein said further axial bearing means comprise plain bearings.

13. Vessel-turret assembly according to claim 1, wherein between said hull structure and said turret radial bearing means (10) are provided below said axial bearings (9).

* * * * *